(12) United States Patent
Weng et al.

(10) Patent No.: US 9,280,802 B2
(45) Date of Patent: Mar. 8, 2016

(54) METHOD AND APPARATUS FOR STORING INFORMATION OF A PICTURE

(71) Applicant: TENCENT TECHNOLOGY (SHENZHEN) COMPANY LIMITED, Shenzhen, Guangdong (CN)

(72) Inventors: Yuedong Weng, Shenzhen (CN); Weiyi Zeng, Shenzhen (CN); Qiang Tu, Shenzhen (CN)

(73) Assignee: TENCENT TECHNOLOGY (SHENZHEN) COMPANY LIMITED, Shenzhen, Guangdong (CN)

( * ) Notice: Subject to any disclaimer, the term of this patent is extended or adjusted under 35 U.S.C. 154(b) by 382 days.

(21) Appl. No.: 13/800,404

(22) Filed: Mar. 13, 2013

(65) Prior Publication Data

US 2013/0194288 A1    Aug. 1, 2013

Related U.S. Application Data

(63) Continuation of application No. PCT/CN2011/078423, filed on Aug. 15, 2011.

(30) Foreign Application Priority Data

Dec. 23, 2010   (CN) .......................... 2010 1 0610815

(51) Int. Cl.
*G06T 11/40*    (2006.01)
*G09G 5/00*    (2006.01)
(Continued)

(52) U.S. Cl.
CPC ............ *G06T 1/60* (2013.01); *G06F 17/30244* (2013.01); *G06F 3/0481* (2013.01);
(Continued)

(58) Field of Classification Search
CPC ......... G06T 11/60; G06T 19/00; G06T 11/00; G06T 15/04; G06T 1/60; G06T 15/005; G06T 11/001; G06T 11/40; G06F 9/4443; G06F 3/0481
USPC ........................ 348/42, 57; 382/154; 345/619
See application file for complete search history.

(56) References Cited

U.S. PATENT DOCUMENTS 6,327,391 B1 *  12/2001  Ohnishi et al. ................ 382/236
2004/0003103 A1 *  1/2004  Witt et al. ..................... 709/231
(Continued)

FOREIGN PATENT DOCUMENTS

CN         1617141 A      5/2005
CN      101189643 A      5/2008
(Continued)

OTHER PUBLICATIONS

Xuelian Wang, PCT/CN2011/078423 International Search Report, Oct. 20, 2011, State Intellectual Property Office of the P.R. China.
(Continued)

*Primary Examiner* — Abderrahim Merouan
(74) *Attorney, Agent, or Firm* — Tim Tingkang Xia, Esq.; Locke Lord LLP (57) ABSTRACT

Disclosed are method and apparatus for storing information of a picture. The method includes presenting a picture file to be edited, which at least includes original picture data; editing the picture file with an interface engine; integrating rendering information of the edited picture file according to a preset picture file format; and storing the original picture data and the rendering information. According to the invention, the interface engine is improved, and thus may directly edit a picture in use, and integrate the rendering information of the edited picture file according to a preset picture format. Therefore, during development, it is not required to store rendering information of a picture into codes, so that no programmer is required to intervene in rendering and setting of the picture. An art-designer may directly operate on the interface engine to change rendering effects, meanwhile, final rendering effects may be observed without running a program.

18 Claims, 5 Drawing Sheets

(51) Int. Cl.
*G06T 1/60* (2006.01)
*G06F 17/30* (2006.01)
*G06T 11/00* (2006.01)
*G06T 15/04* (2011.01)
*G06F 9/44* (2006.01)
*G06T 19/00* (2011.01)
*G06F 3/0481* (2013.01)
*G06T 15/00* (2011.01)

(52) U.S. Cl.
CPC ............ *G06F9/4443* (2013.01); *G06T 11/001* (2013.01); *G06T 11/40* (2013.01); *G06T 15/005* (2013.01); *G06T 15/04* (2013.01); *G06T 19/00* (2013.01)

(56) References Cited

U.S. PATENT DOCUMENTS

| | | | |
|---|---|---|---|
| 2004/0117358 A1* | 6/2004 | von Kaenel et al. | 707/3 |
| 2005/0141941 A1* | 6/2005 | Narusawa et al. | 400/76 |
| 2005/0237337 A1* | 10/2005 | Leather | G06T 15/04 |
| | | | 345/582 |
| 2006/0061792 A1* | 3/2006 | Kim et al. | 358/1.13 |
| 2006/0224686 A1* | 10/2006 | Kitada | 709/209 |
| 2006/0227367 A1* | 10/2006 | Kitada | 358/1.15 |
| 2007/0016897 A1* | 1/2007 | Todd | 717/143 |
| 2007/0043792 A1* | 2/2007 | O'Brien | 707/205 |
| 2009/0116732 A1* | 5/2009 | Zhou et al. | 382/154 |
| 2011/0154296 A1* | 6/2011 | Marenco | 717/128 |
| 2011/0214078 A1* | 9/2011 | Klask et al. | 715/763 |
| 2012/0206653 A1* | 8/2012 | Graves et al. | 348/571 |

FOREIGN PATENT DOCUMENTS

| | | |
|---|---|---|
| CN | 101479765 A | 7/2009 |
| CN | 101789131 A | 7/2010 |
| EP | 2348418 A1 * | 7/2011 |

OTHER PUBLICATIONS

State Intellectual Property Office of the P.R.C. "First Office Action and Search Report of CN Application No. 2010106108153", Sep. 28, 2015.

* cited by examiner

METHOD AND APPARATUS FOR STORING INFORMATION OF A PICTURE

CROSS-REFERENCE TO RELATED APPLICATIONS

This application is a continuation application of International Patent Application No. PCT/CN2011/078423, filed Aug. 15, 2011, entitled "METHOD AND DEVICE FOR STORING PICTURE INFORMATION", by Yuedong WENG et al., which itself claims the priority to Chinese Patent Application No. 201010610815.3, filed Dec. 23, 2010, entitled "METHOD AND DEVICE FOR STORING PICTURE INFORMATION", by Yuedong WENG et al., which are hereby incorporated herein in their entireties by reference.

FIELD OF THE INVENTION

The present invention relates to the field of computers, and more particularly to a method and an apparatus for storing information of a picture and a non-transitory tangible computer-readable medium storing instructions which, when executed by a processor, cause an apparatus to perform a method for storing information of a picture.

BACKGROUND OF THE INVENTION

Interface engine is a tool for interface development in a software product, so as to develop a WYSIWYG (What You See Is What You Get) software interface. The interface engine has been developing for several decades, can be used to manage picture resources during the process of software development, and has functions of cropping pictures and producing special effects.

For most interface engines in the prior art, during the process of developing an interface picture, a developer usually edits a rendering effect of the picture by configuring rendering information of the picture, and directly stores the rendering information of the picture into codes, for example, writes the rendering information of the picture into an XML (Extensible Markup Language) description. When the image needs to be rendered on a screen, the XML is executed to read the rendering information of the picture, so as to present the rendering effect of the picture on the screen.

Since the prior art usually requires a developer to configure many attributes, the developer needs to memorize the names of these attributes. As a result, storage procedure of an existing picture is rather inconvenient to use during the development process. In addition, the rendering effects of the picture cannot be viewed without running a program. Further, the configuration of the rendering information of the picture, though being art-related work, must be performed by a programmer rather than an art designer. Moreover, if the same picture is rendered to different places in the same manner, the information must be written into codes for many times, which not only wastes the human resources, but also increases the size of the installation packet.

Therefore, a heretofore unaddressed need exists in the art to address the aforementioned deficiencies and inadequacies.

SUMMARY OF THE INVENTION

The present invention is directed to, among other things, a method and an apparatus for storing information of a picture, and a non-transitory tangible computer-readable medium storing instructions which, when executed by a processor, cause an apparatus to perform a method for storing information of a picture.

In one aspect of the present invention, the method includes presenting a file of the picture to be edited, wherein the picture file to be edited at least comprises original data of the picture; editing the picture file to be edited with an interface engine, and integrating rendering information of the edited picture file according to a preset picture file format; and storing the original picture data and the rendering information of the picture.

In another aspect of the present invention, the apparatus has a presentation module adapted to present a file of the picture to be edited, wherein the picture file to be edited comprises at least original picture data; an integration module adapted to edit the picture file to be edited with an interface engine, and integrate rendering information of the edited picture file according to a preset picture file format; and a storage module adapted to store the original picture data and the rendering information obtained through integration by the integration module.

In yet another aspect, the present invention relates to a non-transitory tangible computer-readable medium storing instructions which, when executed by a processor, cause an apparatus to perform a method for storing information of a picture. The method includes presenting a file of the picture to be edited, wherein the picture file to be edited at least comprises original data of the picture; editing the picture file to be edited with an interface engine, and integrating rendering information of the edited picture file according to a preset picture file format; and storing the original picture data and the rendering information of the picture.

The technical solutions provided in the embodiments of the present invention have the following beneficial effects:

The interface engine is improved, so that the interface engine may directly edit a picture in use, and integrate the rendering information of the edited picture file according to a preset picture format. Therefore, during development, it is not required to store rendering information of a picture into codes, so that no programmer is required to intervene in rendering and setting of the picture, and an art designer can directly operate on the interface engine to change rendering effects.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment. The drawings do not limit the present invention to the specific embodiments disclosed and described herein. The drawings are not necessarily to scale, emphasis instead being placed upon clearly illustrating the principles of the invention.

DETAILED DESCRIPTION OF THE INVENTION

The following description is merely illustrative in nature and is in no way intended to limit the disclosure, its applications, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. It will be appreciated that same thing can be said in more than one way. Consequently, alternative language and synonyms may be used for any one or more of the terms discussed herein, nor is any special significance to be placed upon whether or not a term is elaborated or discussed herein. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

As used herein, the singular forms "a", "an" and "the" are intended to include the plural forms as well, unless the context clearly indicates otherwise. As used herein, the term "and/or" includes any and all combinations of one or more of the associated listed items.

It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

As used herein, the phrase "at least one of A, B, and C" should be construed to mean a logical (A or B or C), using a non-exclusive logical OR. It should be understood that one or more steps within a method may be executed in different order (or concurrently) without altering the principles of the present disclosure.

As used herein, the term "picture" refers to a visual representation or image of an object, photographed, painted, sculptured, electronically acquired or otherwise made visible.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term "shared", as used herein, means that some or all code from multiple modules may be executed using a single (shared) processor. In addition, some or all code from multiple modules may be stored by a single (shared) memory. The term "group", as used herein, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The description is now made as to the embodiments of the present invention in conjunction with the accompanying drawings in FIGS. 1-5. In accordance with the purposes of this invention, as embodied and broadly described herein, this invention relates to a method and an apparatus for storing information of a picture and a computer-readable medium storing instructions which, when executed by a processor, cause the apparatus to perform the method for storing information of the picture.

Embodiment 1

Figure 1:
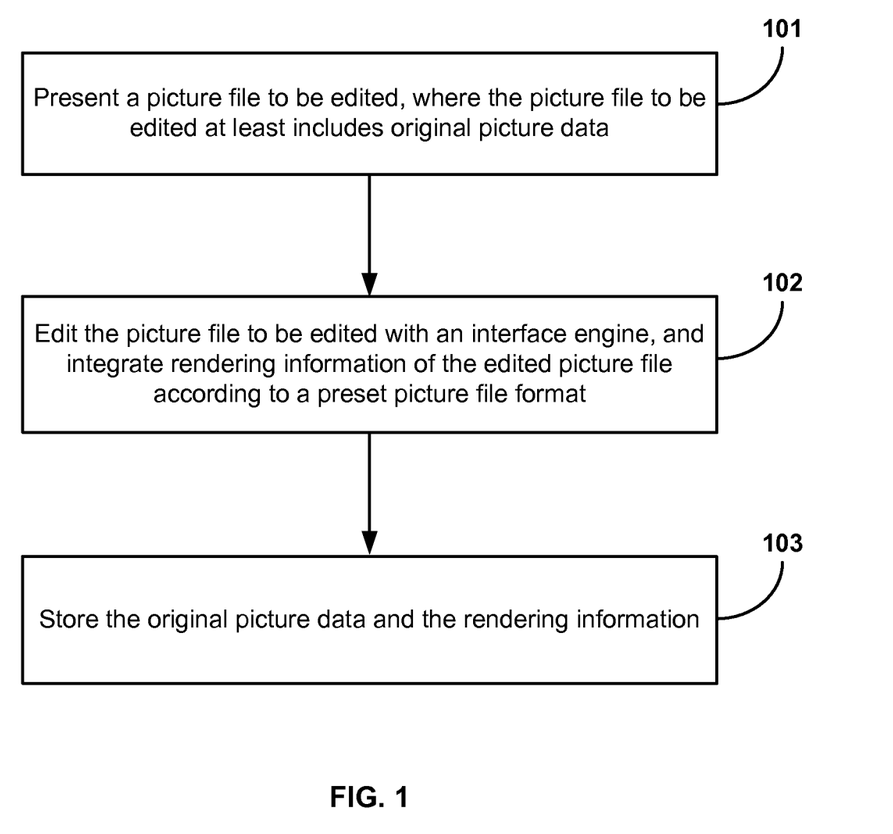
FIG. 1 is a flow chart of a method for storing information of a picture according to a first embodiment of the present invention.

Referring to FIG. 1, a flow chart of a method for storing information of a picture is shown according to the first embodiment of the present invention. The method includes the following steps.

Step 101: A picture file to be edited is presented, where the picture file to be edited at least includes original picture data.

Step 102: The picture file to be edited is edited with an interface engine, and rendering information of the edited picture file is integrated according to a preset picture file format.

Step 103: The original picture data and the rendering information are stored.

In this exemplary embodiment, the interface engine is improved, so that the interface engine may edit a picture, and integrate the rendering information of the edited picture file according to a preset picture file format. Therefore, during development of an interface picture, it is not required to store rendering information into code, so that the developer does not need to memorize numerous attribute names, and rendering effects of the picture may be observed during development, and at the same time, the picture editing work may be performed by an art designer.

Embodiment 2

Figure 2:
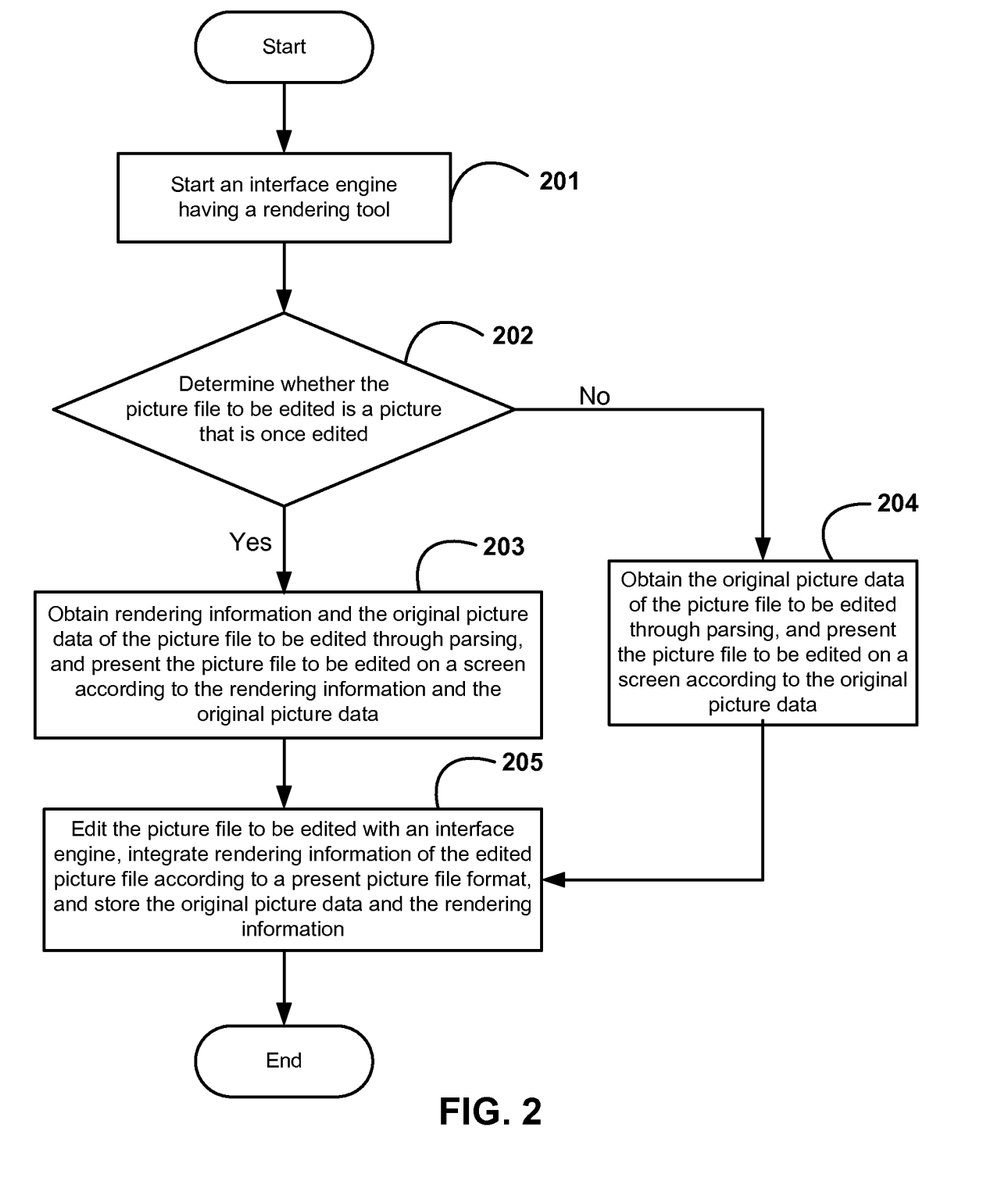
FIG. 2 is a flow chart of a method for storing information of a picture according to a second embodiment of the present invention.

Referring to FIG. 2, a flow chart of a method for storing information of a picture is shown according to a second embodiment of the present invention. The method is an improvement to EMBODIMENT 1 and includes the following steps.

Step 201: An interface engine having a rendering tool is started.

In this embodiment, the interface engine is provided with an interface through which a user edits a picture, and may present, through the rendering tool and in the form of the interface, all rendering attributes for editing the picture by the user, and the user can intuitively modify the rendering information through the rendering tool.

Step 202: It is determined whether the picture file to be edited is a picture that is previously edited, and if yes, Step 203 is performed; otherwise, Step 204 is performed.

In this step, the interface engine determines whether the picture file to be edited is a picture that is previously edited. Specifically, it includes reading preset bytes of the picture file to be edited, determining whether the preset bytes are feature information, and if yes, determining that the picture file to be edited is a picture that is previously edited; otherwise, determining that the picture file to be edited is not a picture that is previously edited.

For example, in this exemplary embodiment, a picture that is previously edited is stored by the interface engine in a preset picture file format, and preset bytes of the edited picture file are set to "TGF\0" during storage. The preset bytes store feature information, and therefore the feature information of the picture file is set to "TGF\0". In addition, in this embodiment, the first four bytes of the picture to be edited may be defined as the preset bytes. Therefore, when the interface engine reads the picture file to be edited, the first four bytes of the picture file to be edited are read, and if the first four bytes are "TGF\0", the picture file to be edited is a picture that is previously edited; otherwise, the picture file to be edited is not a picture that is previously edited.

It should be noted that, the interface engine may also determine whether the read picture file to be edited is a picture that is previously edited by another method: the interface engine determines an extension of the picture file to be edited when reading the picture file to be edited, and if the extension of the picture file to be edited is an extension preset by the interface engine, the picture file to be edited is a picture that is previously edited; otherwise, the picture file to be edited is a picture that is not previously edited.

For example, the extension preset by the interface engine may be defined as ".tfg"; when reading the picture file to be edited, the interface engine reads the extension of the picture file to be edited, and if the extension of the picture file to be edited is ".tfg", the picture file to be edited is a picture that is previously edited; otherwise, the picture file to be edited is not a picture that is previously edited. For example, a picture with an extension of ".jpg", ".bmp" or ".png" is not a picture that is previously edited.

Step 203: Rendering information and the original picture data of the picture file to be edited are obtained through parsing, and the picture file to be edited is presented on a screen according to the rendering information and the original picture data, and then Step 205 is performed.

The interface engine used in this embodiment is an improved interface engine provided by the present invention, and the interface engine stores the edited picture in the preset picture file format of the interface engine, and obtains the rendering information of the picture file to be edited through parsing. In the present invention, a picture file format is preset, and in the process of parsing the picture file to be edited, each field of the picture file to be edited is read, and the rendering information of the picture file to be edited is obtained through parsing according to the preset picture file format.

The preset picture file format provided by the present invention is described in detail below. The file in the preset picture file format includes a plurality of fields, where the fields are connected and stored in sequence. If the rendering information at least includes rendering texture mode information, blend rendering mode information and picture data offset information, the preset picture file format at least includes a rendering texture mode information field, a blend rendering mode information field and a picture data offset information field. If the rendering information further includes nine-square rendering information, key color information and mapping area information, the preset picture file format may further include a nine-square rendering information field, a key color information field and a mapping area information field. In addition, the file in the preset picture file format may further include a version number information field, reserved field and the like. Please refer to Table 1 for details.

TABLE 1

A preset picture file format

| Offset | Size/Type | Description |
|---|---|---|
| | | GFT_FILE_HEADER |
| 0 | 1 DWORD | Set to 'TGF\0' for the moment |
| 4 | 1 WORD | Version number |
| 6 | 1 WORD | Reserved |
| 8 | 1 DWORD | Reserved (originally designed to indicate the file size) |
| 12 | 1 WORD | TextureMode |
| 14 | 1 WORD | BlendMode |
| 16 | 1 DWORD | Picture data offset (when the offset is 0, no picture data is included) |
| | | GFT_INFORMATION |
| | | Nine-square drawing information |
| 0 | 1 DWORD | Set to 'NINE' for the moment |
| 4 | 1 DWORD | Block size |
| 8 | 1 WORD | Left border width |
| 10 | 1 WORD | Top border height |
| 12 | 1 WORD | Right border width |
| 14 | 1 WORD | Bottom border height |
| | | Key color information |
| 0 | 1 DWORD | Set to 'KEY\0' for the moment |
| 4 | 1 DWORD | Block size |
| 8 | 1 BYTE | RED |
| 9 | 1 BYTE | GREEN |
| 10 | 1 BYTE | BLUE |
| 11 | 1 BYTE | Reserved (which may be an alpha channel) |
| | | Mapping area |
| 0 | 1 DWORD | Set to 'UV\0\0' for the moment |
| 4 | 1 DWORD | Block size |
| 8 | 1 WORD | Number of picture blocks divided |
| 10 | 1 WORD | Reserved |
| | | 10h Attribute of each block |
| 0 | 1 WORD | X coordinate of top left corner |
| 2 | 1 WORD | Y coordinate of top left corner |
| 4 | 1 WORD | X coordinate of bottom right corner |

TABLE 1-continued

A preset picture file format

| Offset | Size/Type | Description |
|---|---|---|
| 6 | 1 WORD | Y coordinate of bottom right corner |

Start to store picture data

In the above Table 1, Offset represents the offset; Size represents the size; Type represents the type; DWORD represents a double word, that is, 4 bytes; and WORD represents a word, that is, 2 bytes. Other data in the Table 1 is described in detail as follows:

Version number: for distinguishing the version of the format of the current file, and supporting downward compatibility.

TextureMode: rendering texture mode of picture.

BlendMode: blend rendering mode of picture.

Picture data offset: for recording the offset of real picture data to the file header.

Nine-square drawing information: Nine-square drawing means that the picture is cut into nine parts, where the four corner areas are rendered on the screen on a scale of 1:1, and the four edge areas and the middle area are directly stretched for rendering. This field records information about that the picture is divided into nine parts.

Key color information: for recording which color will finally not be rendered on the screen, so as to achieve an effect of drawing an irregular shape.

Mapping area: for recording which rectangular areas in the image will be finally rendered on the screen.

The file in the preset picture file format includes a plurality of fields, where the fields are connected and stored in sequence. When the picture file to be edited is read, each field is read by reading block information of the field, that is to say, after all block information of a field is read, block information of the next field is read, until all the fields of the picture file to be edited are read.

For blocks of each field, the first N fixed bytes have the same structure. The fixed byte is generally used to represent an intrinsic attribute of the block, such as the name and size of the block.

Specifically, when information of a block of a field is read, a fixed byte of the block is read first. After the fixed byte is read, the fixed byte is parsed, and a corresponding operation is performed according to whether the parsing can be completed. If parsing of the fixed byte is completed, it indicates that the current field can be parsed; in this case, remaining bytes of the block are read, and after all the blocks of the field are read, information of the next field is read. If garbled characters are obtained after parsing, that is, the parsing cannot be completed, it indicates that the current field cannot be parsed; in this case, the current field is skipped, and information of the next field of the picture file to be edited is directly read. Reading and parsing of block information ensure successful reading of information of fields that can be parsed.

In actual applications, since it is required to support downward compatibility during version upgrading, when the current version is not declared, for example, when the current version is an upgraded version, the fixed bytes of the blocks of the current field cannot be parsed, and in this case, the current field is skipped, and information of the next field is directly read, so as to ensure successful reading of all the fields of the current version, that is, successful reading all the declared fields in the current version.

In this embodiment, when the picture file to be edited is presented, the interface engine loads the rendering information and the original picture data of the picture file into the interface engine, in order to directly render the edited picture on the screen, so as to achieve effects that cannot be achieved by the interface engine in the prior art. The interface engine in the prior art is required to run the code, in order to observe the effect of rendering the picture on the screen.

Step 204: The original picture data of the picture file to be edited is obtained through parsing, and the picture file to be edited is presented on a screen according to the original picture data.

In this embodiment, when it is determined that the picture file to be edited is a picture that is not previously edited by the interface engine, the interface engine parses the original picture data according to the format of the picture file to be edited, and presents original picture data on the screen.

For example, if the picture file to be edited is in the jpg format, the interface engine parses the original picture data according to a method for parsing a jpg format file, and presents original picture data on the screen.

Step 205: The picture file to be edited is edited with the interface engine, the rendering information of the edited picture file is integrated according to a preset picture file format, and the original picture data and the rendering information are stored.

If the rendering information only includes rendering texture mode information, blend rendering mode information and picture data offset information, the preset picture file format only includes a rendering texture mode information field, a blend rendering mode information field and a picture data offset information field, and correspondingly, the step of integrating the rendering information of the edited picture file according to a preset picture file format specifically includes: sequentially adding the rendering texture mode information, the blend rendering mode information and the picture data offset information of the edited picture file according to a field sequence in the preset picture file format.

Optionally, if the rendering information further includes nine-square rendering information, key color information and mapping area information, the preset picture file format further includes a nine-square rendering information field, a key color information field and a mapping area information field. Correspondingly, the step of integrating the rendering information of the edited picture file according to a preset picture file format specifically includes sequentially adding the rendering texture mode information, the blend rendering mode information, the picture data offset information, the nine-square rendering information, the key color information and the mapping area information of the edited picture file according to a field sequence in the preset picture file format.

It should be noted that, when the presented picture file to be edited is a picture that is not previously edited, the step of storing the picture file to be edited after editing the picture file to be edited may further include: the interface engine creating, according to a preset picture file format, fields (such as those shown in Table 1) of the feature information and the rendering information for the picture file to be stored, and integrating and storing the fields and the original picture data. A field is also created for the rendering information that is not edited, and when the picture file is stored, the field is stored as a default value.

If the picture file to be edited is a picture that is previously edited, when the picture file to be edited is stored after the picture file to be edited is edited, the interface engine checks the edited fields according to a field sequence in the preset picture file format, and updates data in the edited fields.

It should be noted that, in the process of editing the picture file to be edited, the method further includes: detecting boundary errors of the rendering information of the picture file to be edited.

In addition, when storing the edited file, the interface engine stores the edited file into a preset storage path in the preset picture file format, for example, in a storage medium such as a computer hard disk or a USB disk. At the same time, the rendering information is stored into the file in the preset picture file format, and does not need to be stored into code, which overcomes the problems that the interface engine in the prior art is rather inconvenient to use, usually requires configuration of many attributes, requires memorizing the names of the attributes, and fails to support a real-time preview effect, and that the effect cannot be observed without running a program.

According to this embodiment disclosed above, the interface engine is improved, so that the interface engine may edit a picture, and integrate the rendering information of the edited picture file according to a preset picture file format. Therefore, during development of an interface picture, it is not required to store rendering information into code, so that the developer does not need to memorize numerous attribute names, and rendering effects of the picture may be observed during development, and at the same time, the picture editing work may be performed by an art designer.

Embodiment 3

Figure 3:
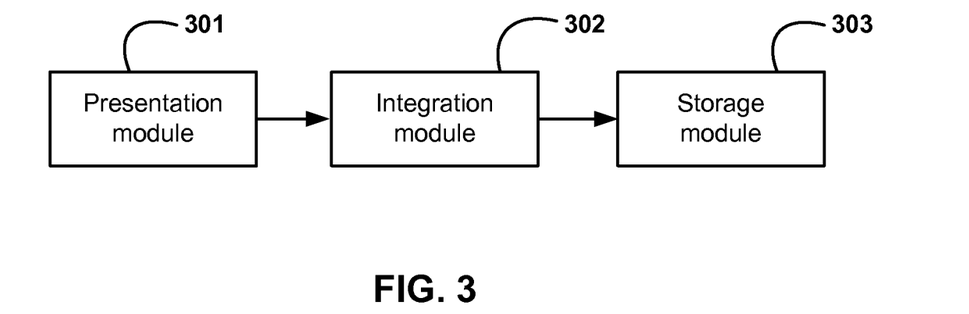
FIG. 3 is a schematic structural view of an apparatus for storing information of a picture according to a third embodiment of the present invention.

Referring to FIG. 3, a schematic structural view of an apparatus for storing information of a picture is shown according to a third embodiment of the present invention. The apparatus includes:

a presentation module 301, adapted to present a picture file to be edited, where the picture file to be edited at least includes original picture data;

a integration module 302, adapted to edit the picture file to be edited with an interface engine, and integrate rendering information of the edited picture file according to a preset picture file format; and a storage module 303, adapted to store the original picture data and the rendering information obtained through integration by the integration module 302.

Figure 4:
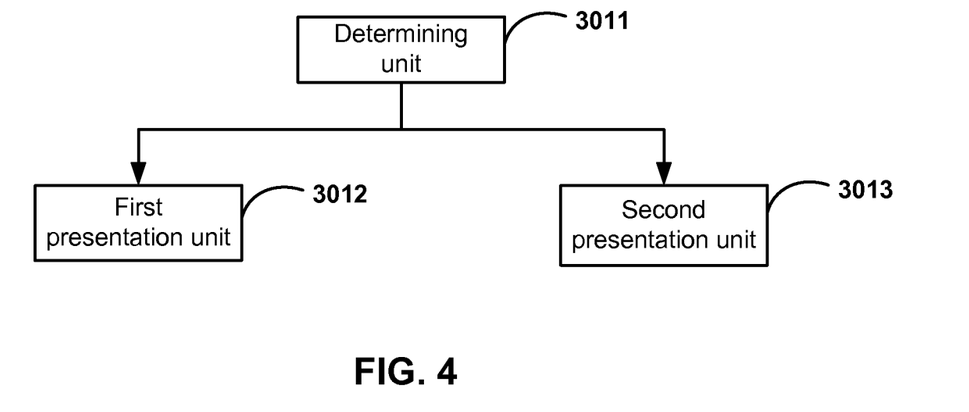
FIG. 4 is a schematic structural view of a presentation module according to one embodiment of the present invention.

Further, as shown in FIG. 4, the presentation module 301 specifically includes:

a determining unit 3011, adapted to determine whether the picture file to be edited is a picture that is previously edited;

a first presentation unit 3012, adapted to obtain the rendering information and the original picture data of the picture file to be edited through parsing, and present the picture file to be edited on a screen according to the rendering information and the original picture data, when the determining unit 3011 determines that the picture file to be edited is a picture that is previously edited; and a second presentation unit 3013, adapted to obtain the original picture data of the picture file to be edited through parsing, and presenting the picture file to be edited on the screen according to the original picture data, when the determining unit 3011 determines that the picture file to be edited is not a picture that is previously edited.

It should be noted that, the determining unit 3011 is specifically employed to read out preset bytes of the picture file to be edited, determine whether the preset bytes are feature information, and if yes, determine that the picture file to be edited is a picture that is previously edited; otherwise, determine that the picture file to be edited is not a picture that is previously edited.

The first presentation unit 3012 specifically includes a first reading subunit and a first presentation subunit, where the first reading subunit is adapted to read out each field of the picture file to be edited, and obtaining the rendering information and the original picture data of the picture file to be edited through parsing according to each field; and the first presentation subunit is adapted to present the picture file to be edited on the screen according to the rendering information and the original picture data.

The first reading subunit is specifically adapted to read out a fixed byte of a block of the field; parse the fixed byte, and if garbled characters are obtained after parsing, skip the field, and directly read out a next field of the picture file to be edited; and obtain the rendering information and the original picture data of the picture file to be edited through parsing according to each field.

The rendering information at least includes rendering texture mode information, blend rendering mode information and picture data offset information, and the preset picture file format at least includes a rendering texture mode information field, a blend rendering mode information field, and a picture data offset information field. Correspondingly, the integration module 302 is specifically adapted to sequentially add the rendering texture mode information, the blend rendering mode information and the picture data offset information of the edited picture file according to a field sequence in the preset picture file format.

Optionally, the rendering information further includes nine-square rendering information, key color information and mapping area information, and the preset picture file format further includes a nine-square rendering information field, a key color information field and a mapping area information field. Correspondingly, the integration module 302 is specifically adapted to sequentially add the rendering texture mode information, the blend rendering mode information, the picture data offset information, the nine-square rendering information, the key color information and the mapping area information of the edited picture file according to a field sequence in the preset picture file format.

Figure 5:
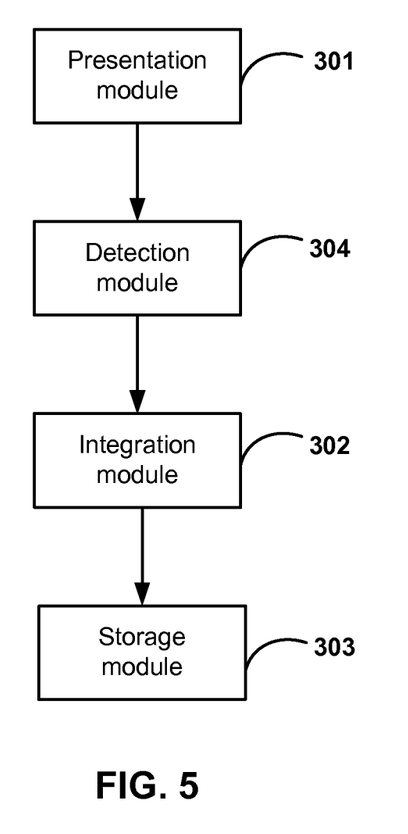
FIG. 5 is a schematic structural view of the apparatus for storing information of a picture according to one embodiment of the present invention.

Additionally, as shown in FIG. 5, the apparatus may further include:

a detection module 304, adapted to detect boundary errors of the rendering information of the picture file to be edited in the process of editing the picture file to be edited.

In this embodiment, the interface engine edits a picture, and integrates the rendering information of the edited picture file according to a preset picture file format. Therefore, during development of an interface picture, it is not required to store rendering information into code, so that the developer does not need to memorize numerous attribute names, and rendering effects of the picture may be observed during development, and at the same time, the picture editing work may be performed by an art designer.

It should be noted that, the apparatus for storing information of a picture provided in the above embodiment is illustrated through the division of the above functional modules by way of example only. In actual applications, the above functions may be implemented by different functional modules according to the actual need, that is, the internal structure of the apparatus may be divided into different functional modules for completing all or part of the above functions. In addition, the embodiments of the apparatus for storing information of a picture and the method for storing information of a picture provided in the above embodiments are based on the same idea. The specific implementation process is disclosed in the embodiments of the method, and is not further described herein.

The sequence numbers of the above embodiments of the present invention are merely for description purpose but do not indicate the preference of the embodiments.

All or part of the steps according to the embodiments of the present invention may be implemented by using software, and the corresponding software programs may be stored in a readable storage medium, such as a compact disk or a hard disk.

Another aspect of the present invention provides a non-transitory tangible computer-readable medium storing instructions which, when executed by a processor, cause an apparatus to perform a method for storing information of a picture. The non-transitory tangible computer-readable storage medium includes, but not limited to, disk, CD-ROM, read-only memory (ROM), random memory (RAM), flash dive, or the likes.

As discussed above, the method in one embodiment includes presenting a file of the picture to be edited, wherein the picture file to be edited at least comprises original data of the picture; editing the picture file to be edited with an interface engine, and integrating rendering information of the edited picture file according to a preset picture file format; and storing the original picture data and the rendering information of the picture.

In one embodiment, the presenting of the picture file to be edited includes determining whether the picture file to be edited is a picture that is previously edited. If the picture file to be edited is a picture that is previously edited, the presenting of the picture file to be edited includes obtaining the rendering information and the original picture data of the picture file to be edited through parsing, and presenting the picture file to be edited on a screen according to the rendering information and the original picture data. If the picture file to be edited is a picture that is not previously edited, the presenting of the picture file to be edited includes obtaining the original picture data of the picture file to be edited through parsing, and presenting the picture file to be edited on the screen according to the original picture data.

In one embodiment, the determining of whether the picture file to be edited is a picture that is previously edited comprises reading out preset bytes of the picture file to be edited; and determining whether the preset bytes are feature information, if yes, determining that the picture file to be edited is a picture that is previously edited; if not, determining that the picture file to be edited is a picture that is not previously edited.

Additionally, the method also comprises detecting boundary errors of the rendering information of the picture file to be edited in the process of editing the picture file to be edited.

In one embodiment, the rendering information comprises at least rendering texture mode information, blend rendering mode information and picture data offset information, and the preset picture file format comprises at least a rendering texture mode information field, a blend rendering mode information field, and a picture data offset information field. Accordingly, the integrating of the rendering information of the edited picture file according to the preset picture file format comprises sequentially adding the rendering texture mode information, the blend rendering mode information and the picture data offset information of the edited picture file according to a field sequence in the preset picture file format.

Furthermore, the rendering information may also have nine-square rendering information, key color information and mapping area information, and the preset picture file format further comprises a nine-square rendering information field, a key color information field and a mapping area information field. The integrating of the rendering information of the edited picture file according to a preset picture file format specifically comprises sequentially adding the rendering texture mode information, the blend rendering mode information, the picture data offset information, the nine-square rendering information, the key color information and the mapping area information of the edited picture file according to a field sequence in the preset picture file format.

In one embodiment, the obtaining of the rendering information and the original picture data of the picture file to be edited through parsing comprises reading out each field of the picture file to be edited; and obtaining the rendering information and the original picture data of the picture file to be edited through parsing according to each field.

In one embodiment, the reading out of each field of the picture file to be edited comprises reading out a fixed byte of a block of the field; and parsing the fixed byte, and if garbled characters are obtained after parsing, skipping the field, and directly reading out a next field of the picture file to be edited.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments are chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A method for storing information of a picture, comprising:
    presenting a file of the picture to be edited, wherein the picture file to be edited at least comprises original data of the picture;
    editing the picture file to be edited with an interface engine, and integrating rendering information of the edited picture file according to a preset picture file format; and
    storing the original picture data and the rendering information of the picture,
    wherein the rendering information comprises at least rendering texture mode information, blend rendering mode information and picture data offset information, and the preset picture file format comprises at least a rendering texture mode information field, a blend rendering mode information field, and a picture data offset information field; and
    wherein the integrating of the rendering information of the edited picture file according to the preset picture file format comprises sequentially adding the rendering texture mode information, the blend rendering mode information and the picture data offset information of the edited picture file according to a field sequence in the preset picture file format.

2. The method according to claim 1, wherein the presenting of the picture file to be edited comprises:
    determining whether the picture file to be edited is a picture that is previously edited;
    if yes, obtaining the rendering information and the original picture data of the picture file to be edited through parsing, and presenting the picture file to be edited on a screen according to the rendering information and the original picture data; and if not, obtaining the original picture data of the picture file to be edited through parsing, and presenting the picture file to be edited on the screen according to the original picture data.

3. The method according to claim 2, wherein the determining of whether the picture file to be edited is a picture that is previously edited comprises:

reading out preset bytes of the picture file to be edited; and determining whether the preset bytes are feature information, if yes, determining that the picture file to be edited is a picture that is previously edited; if not, determining that the picture file to be edited is a picture that is not previously edited.

4. The method according to claim 1, further comprising:

detecting boundary errors of the rendering information of the picture file to be edited in the process of editing the picture file to be edited.

5. The method according to claim 1, wherein the rendering information further comprises nine-square rendering information, key color information and mapping area information, and the preset picture file format further comprises a nine-square rendering information field, a key color information field and a mapping area information field; and wherein the integrating of the rendering information of the edited picture file according to a preset picture file format specifically comprises sequentially adding the rendering texture mode information, the blend rendering mode information, the picture data offset information, the nine-square rendering information, the key color information and the mapping area information of the edited picture file according to a field sequence in the preset picture file format.

6. The method according to claim 2, wherein the obtaining of the rendering information and the original picture data of the picture file to be edited through parsing comprises:

reading out each field of the picture file to be edited; and obtaining the rendering information and the original picture data of the picture file to be edited through parsing according to each field.

7. The method according to claim 6, wherein the reading out of each field of the picture file to be edited comprises:

reading out a fixed byte of a block of the field; and parsing the fixed byte, and if garbled characters are obtained after parsing, skipping the field, and directly reading out a next field of the picture file to be edited.

8. An apparatus for storing information of a picture, comprising:

a presentation module adapted to present a file of the picture to be edited, wherein the picture file to be edited comprises at least original picture data;

an integration module adapted to edit the picture file to be edited with an interface engine, and integrate rendering information of the edited picture file according to a preset picture file format; and a storage module adapted to store the original picture data and the rendering information obtained through integration by the integration module, wherein the rendering information comprises at least rendering texture mode information, blend rendering mode information and picture data offset information, and the preset picture file format comprises at least a rendering texture mode information field, a blend rendering mode information field, and a picture data offset information field; and wherein the integration module is adapted to sequentially add the rendering texture mode information, the blend rendering mode information and the picture data offset information of the edited picture file according to a field sequence in the preset picture file format.

9. The apparatus according to claim 8, wherein the presentation module comprises:

a determining unit adapted to determine whether the picture file to be edited is a picture that is previously edited;

a first presentation unit adapted to obtain rendering information and the original picture data of the picture file to be edited through parsing, and present the picture file to be edited on a screen according to the rendering information and the original picture data, when the determining unit determines that the picture file to be edited is a picture that is previously edited; and a second presentation unit adapted to obtain the original picture data of the picture file to be edited through parsing, and present the picture file to be edited on the screen according to the original picture data, when the determining unit determines that the picture file to be edited is a picture that is not previously edited.

10. The apparatus according to claim 9, wherein the determining unit is adapted to reading out preset bytes of the picture file to be edited, and determine whether the preset bytes are feature information, if yes, determine that the picture file to be edited is a picture that is previously edited, and if not, determine that the picture file to be edited is a picture that is not previously edited.

11. The apparatus according to claim 8, further comprising:

a detection module adapted to detect boundary errors of the rendering information of the picture file to be edited in the process of editing the picture file to be edited.

12. The apparatus according to claim 8, wherein the rendering information further comprises nine-square rendering information, key color information and mapping area information, and the preset picture file format further comprises a nine-square rendering information field, a key color information field and a mapping area information field; and wherein the integration module is adapted to sequentially add the rendering texture mode information, the blend rendering mode information, the picture data offset information, the nine-square rendering information, the key color information and the mapping area information of the edited picture file according to a field sequence in the preset picture file format.

13. The apparatus according to claim 9, wherein the first presentation unit comprises a first reading subunit and a first presentation subunit, wherein the first reading subunit is adapted to read out each field of the picture file to be edited, and obtain the rendering information and the original picture data of the picture file to be edited through parsing according to each field; and wherein the first presentation subunit is adapted to present the picture file to be edited on the screen according to the rendering information and the original picture data.

14. The apparatus according to claim 13, wherein the first reading subunit is adapted to read out a fixed byte of a block of the field;

parse the fixed byte, and if garbled characters are obtained after parsing, skip the field, and directly read out a next field of the picture file to be edited; and obtain the rendering information and the original picture data of the picture file to be edited through parsing according to each field.

15. A non-transitory tangible computer-readable medium storing instructions which, when executed by a processor, cause an apparatus to perform a method for storing information of a picture, the method comprising:
- presenting a file of the picture to be edited, wherein the picture file to be edited at least comprises original data of the picture;
- editing the picture file to be edited with an interface engine, and integrating rendering information of the edited picture file according to a preset picture file format; and
- storing the original picture data and the rendering information of the picture,
- wherein the rendering information comprises at least rendering texture mode information, blend rendering mode information and picture data offset information, and the preset picture file format comprises at least a rendering texture mode information field, a blend rendering mode information field, and a picture data offset information field; and
- wherein the integrating of the rendering information of the edited picture file according to the preset picture file format comprises sequentially adding the rendering texture mode information, the blend rendering mode information and the picture data offset information of the edited picture file according to a field sequence in the preset picture file format.

16. The non-transitory tangible computer-readable medium according to claim 15, wherein the presenting of the picture file to be edited comprises:
- determining whether the picture file to be edited is a picture that is previously edited;
- if yes, obtaining the rendering information and the original picture data of the picture file to be edited through parsing, and presenting the picture file to be edited on a screen according to the rendering information and the original picture data; and
- if not, obtaining the original picture data of the picture file to be edited through parsing, and presenting the picture file to be edited on the screen according to the original picture data.

17. The non-transitory tangible computer-readable medium according to claim 16, wherein the determining of whether the picture file to be edited is a picture that is previously edited comprises:
- reading out preset bytes of the picture file to be edited; and
- determining whether the preset bytes are feature information, if yes, determining that the picture file to be edited is a picture that is previously edited; if not, determining that the picture file to be edited is a picture that is not previously edited.

18. The non-transitory tangible computer-readable medium according to claim 15, wherein the method further comprises:
- detecting boundary errors of the rendering information of the picture file to be edited in the process of editing the picture file to be edited.

* * * * *